United States Patent
Vohrer

(10) Patent No.: US 6,729,355 B2
(45) Date of Patent: May 4, 2004

(54) REINFORCED FLEXIBLE HOSE

(75) Inventor: Christoph Vohrer, Königstein (DE)

(73) Assignee: Vohran Patentverwertungs-GmbH, Königstein (DE)

(*) Notice: Subject to any disclaimer, the term of this patent is extended or adjusted under 35 U.S.C. 154(b) by 0 days.

(21) Appl. No.: 10/218,238

(22) Filed: Aug. 14, 2002

(65) Prior Publication Data

US 2003/0034082 A1 Feb. 20, 2003

(30) Foreign Application Priority Data

Aug. 18, 2001 (DE) .................... 201 13 705 U

(51) Int. Cl.⁷ ................................. F16L 9/00
(52) U.S. Cl. ............... 138/172; 138/141; 138/138; 138/140; 138/174
(58) Field of Search ............... 138/172, 132, 138/133, 174, 137, 140, 141, 138, 143

(56) References Cited

U.S. PATENT DOCUMENTS

| 4,172,474 A | * 10/1979 | Stahl ..................... 138/132 |
| 4,495,018 A | * 1/1985 | Vohrer ................... 156/187 |
| 4,620,569 A | * 11/1986 | von Glanstatten et al. .. 138/132 |

FOREIGN PATENT DOCUMENTS

| DE | 2 261 126 | 8/1974 |
| DE | 30 17 326 | 11/1981 |
| DE | 30 49 501 | 7/1982 |
| DE | G 83 07 226 | 7/1984 |
| DE | 33 10 033 | 9/1984 |
| DE | 37 44 108 | 7/1989 |
| DE | 295 13 280 | 10/1995 |
| DE | 195 11 216 | 10/1996 |
| DE | 195 45 603 | 6/1997 |
| DE | 197 37 676 | 2/1999 |
| DE | 298 22 170 | 2/1999 |
| EP | 0 099 999 | 9/1987 |
| EP | 0 685 676 | 6/1995 |

* cited by examiner

*Primary Examiner*—Patrick Brinson
(74) *Attorney, Agent, or Firm*—Koda & Androlia

(57) ABSTRACT

A reinforced flexible hose, especially a shower hose, being comprised of a thin-walled reinforced inner hose, at least one outside outer hose, at least one helical support between the inner hose and the outer hose, and reinforcement bands which are oriented in the hose's axial direction radially outside the helical support; and the reinforcement bands being connected to neighboring elements of the hose. In order for the hose to have a high-gloss metallized appearance over essentially the entire surface and to be light and highly flexible and also not to fatigue or tear when it is frequently bent, the reinforcement bands are made of an essentially unstretchable, high-gloss metallized film. They are arranged in the area radially between a top side of the helical support and below an outside surface of the outside outer hose.

13 Claims, 2 Drawing Sheets

REINFORCED FLEXIBLE HOSE

BACKGROUND OF THE INVENTION

1. Field of the Invention

The invention relates to a reinforced flexible hose and more particularly to a shower hose.

2. Prior Art

A known hose of this type comprises a thin-walled inner hose with reinforcements which has an outer hose, consisting of thermoplastic or elastomeric material, provided thereon. The reinforcements are connected to the inner hose by means of a heat-activated glue (EP 0 099 999 B1).

In order to reinforce the inner hose so that a pressure-resistant reinforced hose built thereon remains light and flexible, but can also be made especially strong, axial reinforcement bands, which are made of a heat-activated glue or a glue-coated plastic and which have textile threads, are disposed on the helical support as a solid layer. These bands (called reinforcement bands or bands for short) allow a secure connection especially between a helical support on the inner hose and the outer hose, without other adhesives. The bands reinforce the outer hose of such a very light and flexible hose so that the hose does not tear, even when the hose is frequently bent.

However, these bands have the disadvantage. They do not make it possible to achieve a high-gloss metallization of the surface of the hose, which is frequently desired in bath and sanitary facilities.

Accordingly, an attempt has been made to give a metallic appearance to such hoses. However, these attempts have not been completely satisfactory.

Thus, it is known for a flexible reinforced plastic hose (with inner and outer hoses which are made of plastomeric or elastomeric material and have axial reinforcement threads and further with a reinforcement band that is made of a relatively hard material and disposed between the inner and outer hoses in the shape of a helix with axial separations) to have the reinforcement band enclosed by a jacket made of a relatively soft plastomeric or elastomeric material (DE 30 17 326 C2). This reinforcement band can have a metallized surface. However, the inner hose, which is not metallized, can be seen in the intermediate space between the helix of the reinforcement band, so that the metallized surface is interrupted.

A similarly imperfect impression of overall metallization is achieved by another, to the state-of-the-art reinforced hose that is comprised of an inner hose and an outer hose made of thermoplastic or elastomeric material and a wire helix, which is located in a helical cavity between the inner and outer hoses (DE 22 61 126 B1). A band of relatively hard thermoplastic or elastomeric material is wound between the wire helix so as to be parallel thereto, forming the helical cavity. In practice, this band has been given a metallized appearance. At the same time, the overall metallic impression is interrupted by the helical cavity between the inner and outer hoses, which is not completely filled by the wire helix.

An essentially uninterrupted metallic appearance can be achieved by another state-of-the-art hose, especially a shower hose. This shower hose includes an inner hose and an outer hose disposed over it as well as pigmentation in the area between the inner hose and the outer hose (DE 195 11 216 A1), with the outside of the inner hose and/or the inside of the outer hose being directly pigmented. This double-walled hose can also have a reinforcement, especially in the form of reinforcement threads embedded into the inner hose. Even if this double-walled hose has a solid metallic appearance, it is still not satisfactory, since the metallic color layer looks dull. In addition, this hose is not very flexible in order to limit the stretching or compression of the color layer as much as possible when the hose is bent, thus keeping it from being destroyed.

These disadvantages also apply to a sanitary facility hose that is externally very similar and that has a pigmented and/or metallized surface, with the carrier for the pigment and/or the metallization being provided by at least one hot-stamped foil which is connected to a hose exterior that is at least partially outwardly visible (EP 0 685 676 A2). The shower hose is comprised of an inner hose, which has bands or strips of a soft hot-stamped foil (consisting of a glue layer with metallized surface) glued thereon and parallel to the axis or in a helical shape, and an outer hose, which is extruded onto the inner hose and the bands as a protective layer. The hot-stamped foil pressed onto the outside of the hose, with its pigmented and/or metallized layer, is intended to go along with movements of the hose, especially stretching and compression, without showing cracks or wrinkles. In particular, the hot-stamped foil can be made to cover the whole surface in the form of four bands, each of which is wider than a quarter of the outside circumference of the hose, with mutual overlapping of the bands. As a rule, this sanitary facilities hose also can only achieve a dull metallic surface. The bands of soft hot-stamped foil contribute little strength to the structure of the hose.

SUMMARY OF THE INVENTION

Therefore, the object of the present invention is to provide an improved, reinforced, flexible hose in which the hose has a simple design and is highly flexible and does not fatigue or tear, even when it is frequently bent, but still has a high-gloss metallized appearance over essentially its entire surface.

This object is accomplished by a unique structure for an reinforced flexible hose of the present invention in which reinforcement bands made of an essentially unstretchable high-gloss metallized film in the shown configuration not only improve the strength and bending properties of the hose, so that even when the hose is frequently bent it does not fatigue and tear, but also achieve an aesthetic appearance that is especially appealing, since the high-gloss metallized reinforcement bands allow a high-gloss chrome effect to be achieved over practically the entire surface of the hose. The entire structure of the hose is light and makes it possible for the hose to be highly flexible. The hose owes good mechanical properties and its high-gloss metallic impression essentially to the material that is selected for the reinforcement bands and its metallizability. For this purpose, it is especially advantageous for the reinforcement bands to be made of polyester and for this polyester to have a tensile strength for reinforcement bands of certain dimensions.

A plastic film used for the manufacture of reinforcement bands, such as the polyester film, is distinguished by the fact that although it can hardly stretch in the longitudinal direction, it has very flexible bending and folding properties, which means that it withstands frequent bending changes. It is preferable for the high-gloss metallization of the film to be achieved by vapor deposition.

It is expedient for the film or the reinforcement bands made therefrom to have a transparent lacquer or glue on both sides in order to protect the metallization of the film and to achieve adhesion between the elements of the hose, especially the helical support and the outer hose, which should be solidly connected to the reinforcement bands.

To protect the metallized reinforcement bands and to improve the adhesion, they can have a PVC jacket.

The reinforcement bands are coated with a metallic gloss on only one side, which makes them favorable to manufacture, and should be disposed on a base hose in such a way that the coated glossy side faces outward.

The term 'base hose' refers to that part of the entire structure of the hose that is located beneath, in the radial direction, the reinforcement bands, or at least beneath one outer hose in which the reinforcement bands can be embedded. The base hose comprises a thin-walled, reinforced inner hose which bears at least one helical support, a plastic band with a rectangular cross section. If necessary, it is also possible for a helical wire helix to be disposed in the helical space between the helical supports. However, it can also be sufficient for the helical support itself to be made of a relatively hard material.

With the above structure of the base hose, the reinforcement bands are disposed between the helical support and an inside surface of the outer hose and glued together.

In this case, if gaps remain between the longitudinal reinforcement bands, it is possible to create a direct connection between the helical support and the outer hose in the area of the gaps, which supports the adhesion of the reinforcement bands to the helical support and the outer hose.

However, instead, the reinforcement bands can also be disposed between the first outer hose and a second outer hose which is outside the first outer hose in the radial direction and is connected thereto.

Another variant of the reinforced flexible hose is that the reinforcement bands are embedded in the single-piece outer hose. In this structure, the surface of the outer hose can be shaped as a prism comprising several flat outer surfaces with the reinforcement bands aligned in a plane parallel to them, all to simplify manufacturing or for aesthetic reasons. Thus, the reinforcement bands do not need to be curved to match the curvature of the outer periphery, especially that of a cylindrical outer hose, a process that is relatively expensive.

To produce a solid glossy metallic impression, the reinforcement bands can be disposed so as to abut one another along the longitudinal direction. The reinforcement bands can overlap at the edge where they meet. However, instead, it may suffice if gaps remain between the longitudinal reinforcement bands as described above.

It is preferable to make the reinforced flexible hose with the typical diameter of a shower hose using reinforcement bands of the indicated type which are 0.05 to 0.1 mm thick and about 3 to 6 mm wide.

Advantageously, in a sturdy reinforced flexible hose, each one of the reinforcement bands has a tensile strength of at least 10, preferably 14 Newtons, with a thickness of 0.075 mm and a width of 3 mm.

DETAILED DESCRIPTION OF THE INVENTION

Figure 1:
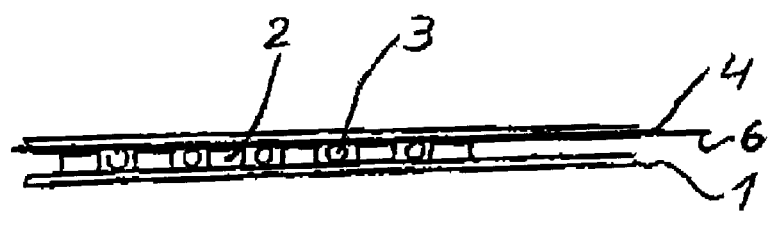
FIG. 1 is a longitudinal cross section of a first embodiment of a base hose with an outer hose disposed thereon, according to the present invention.

In the longitudinal section along the wall of a base hose in the preferred embodiment shown in FIG. 1, a thin walled inner hose reinforced with reinforcement elements (not shown) is marked with the reference numeral 1. Provided on this inner hose 1 is a band-shaped helical support 2 which is made of a plastic; and in the helical intermediate space of the helical support 2, a wire helix 3, which also provides a support, is provided. The base hose that is made in this way has an outer hose 4 thereon. The helical support 2 is adhered to the inner hose 1 and to the outer hose 4. The wire helix 3 does not have any adhesion. The base hose 1 and outer hose 4 that are shown and described above belong to the state of the art. This also applies for the embodiment of the base hose with the outer hose shown in FIG. 2.

Figure 2:
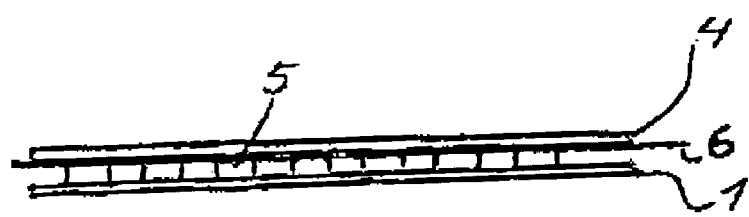
FIG. 2 is a corresponding section of a second embodiment of the base hose with an outer hose.

The base hose of FIG. 2, which has the inner hose 1 and only a helical support 5 and the outer hose 4, differs from the embodiment shown in FIG. 1 by the fact that the base hose of FIG. 2 has no wire helix. Instead, the helical support 5 can consist of harder plastic than the helical support 2 shown in FIG. 1. Helical supports 2 and 5 are both in the form of a band with a rectangular cross section. Thus, the base hose shown in FIG. 2 is comprised only of the inner hose 1 and the helical support 5.

Figure 3:
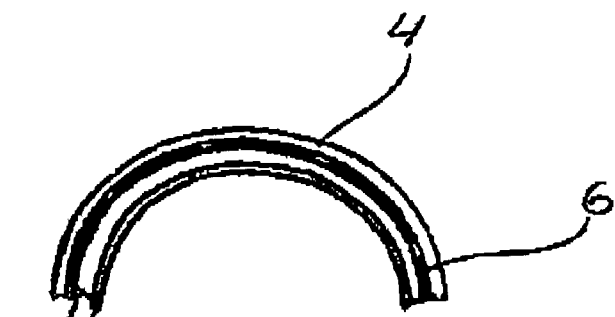
FIG. 3 is a first embodiment of a reinforced flexible hose with reinforcement bends shown in cross section.

FIG. 3 shows how a hose structure based on one of the base hoses shown in FIGS. 1 and 2 is supplemented according to the present invention by reinforcement bands 6 made of a metallized film which is essentially unstretchable in the longitudinal direction of the hose, i.e., perpendicular to the plane of the drawing sheet, and which is located radially beneath outer hose 4, on its inner wall. Here, the reinforcement bands 6 are disposed so as to have gaps between one another. The outer hose 4 is extruded over the reinforcement bands 6 which adhere to helical support 2 of the base hose (see FIG. 1 or 2). In the gaps, the outer hose 4 can be connected to the helical support of the base hose so as to improve the overall adhesion between these elements.

Figure 4:
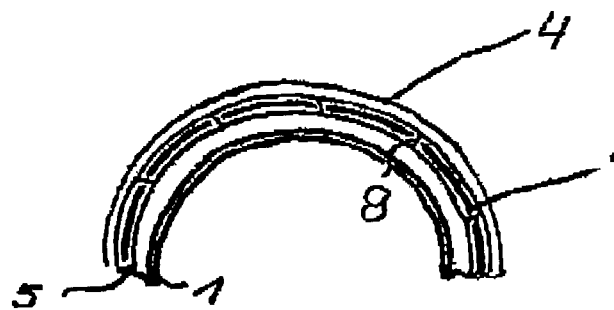
FIG. 4 is a second embodiment of a reinforced flexible hose with reinforcement hands, also in cross section.

In the embodiment shown in FIG. 4, the reinforcement bands 7 have PVC jackets 8. Here, the jackets 8 of the metallized reinforcement bands 7, which are essentially unstretchable in the longitudinal direction of the hose, abut one another tightly; and they are surrounded by the outer hose 4.

Figure 5:
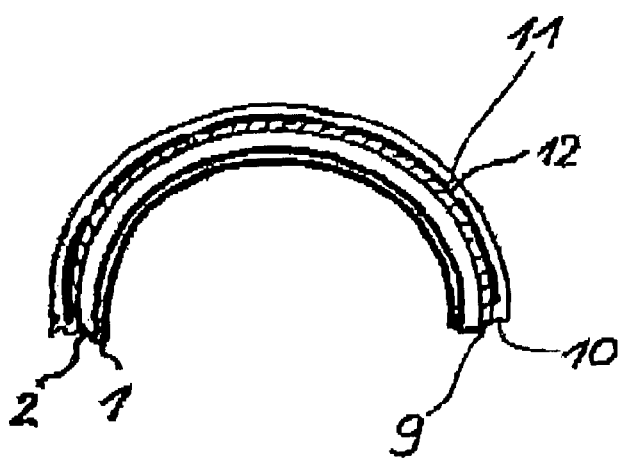
FIG. 5 is a third embodiment of a reinforced flexible hose in cross section.

In the third embodiment of the reinforced flexible hose shown in FIG. 5, the base hose is completed by a first outer hose 9, which is crosshatched, and a second outer hose 10. Here, the reinforcement bands 11 are disposed parallel to the longitudinal axis of the hose, between the first outer hose 9 and the second outer hose 10, and this is done so that the neighboring reinforcement bands have gaps between them in which the first outer hose 9 and the second outer hose 10 adhered directly to one another. Therefore, these gaps can also be called ribs 12.

Figure 6:
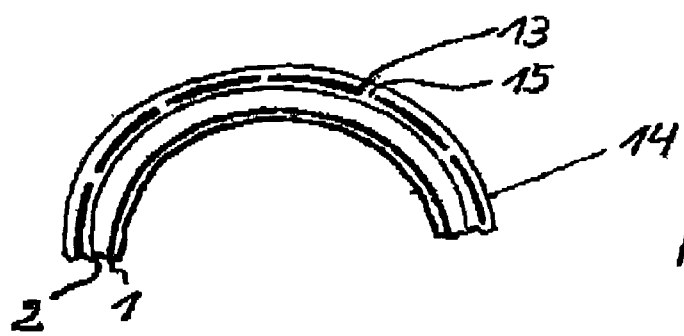
FIG. 6 is a fourth embodiment of a reinforced flexible hose in cross section.

In the fourth embodiment shown in FIG. 6, the reinforcement bands 13 are embedded in an outer hose 14 that is only correspondingly thick, and this is done in such a way as to leave gaps between the bands 13, so that ribs 15 are formed, which ensure that the outer hose 14 is a single piece.

Figure 7:
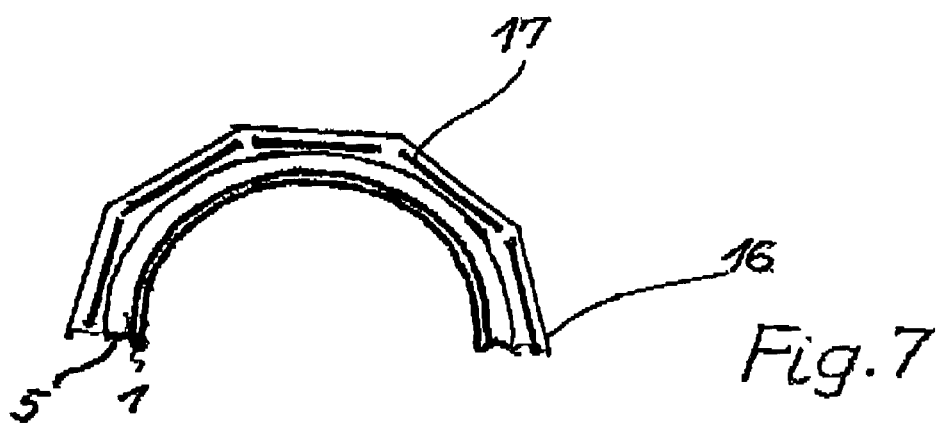
FIG. 7 is a fifth embodiment of a reinforced flexible hose in cross section.

In the fifth embodiment shown in FIG. 7, an outer hose 16 has a shape of a right prism with flat outer faces instead of the cylindrical outer surface according to the first through the fourth embodiments. The single-piece outer hose 16 has metallized reinforcement bands which are essentially unstretchable in the axial direction of the hose and are disposed with gaps in between, and each of the reinforcement bands 17 is disposed so as to lie parallel to the closest outer surface of the outer hose. Thus, here the reinforcement bands 17 are also flat, which facilitates their manipulation during manufacturing.

Producing the reinforced flexible hose involves starting from one of the base hoses shown in FIGS. 1 and 2, after which a helical support made of a plastic band having a rectangular cross section is wound onto an inner hose which has longitudinal threads. The surface of the helix has a heat-activated glue thereon, which makes the helix adhere to the inner hose and to the outer hose that is subsequently disposed on the inner hose.

The rest of the hose structure proceeds in the following manner:

The base hose runs through an extrusion head, which surrounds the base hose with an outer hose. When the base hose runs into the extrusion head, the base hose has reinforcement bands laid thereon which are uniformly distributed over the circumference of the base hose and come to lie parallel to the axis of the hose and to one another on the surface of the base hose. The reinforcement bands are fixed there by the outer hose that is extruded onto them. Reinforcement bands which have proved to be good are bands about 3 to 6 mm wide and 0.05 to 0.1 mm thick that are made of a tough plastic film which is hardly stretchable in the longitudinal direction but has very flexible bending properties, and which has high-gloss metallization.

The reinforcement bands cut from this plastic film withstand frequent bending changes. The metallization of the film is generally achieved by vapor deposition of aluminum on the film. Before being provided on the base hose, the reinforcement bands, that is the film of which the reinforcement bands are made, are processed to have a transparent lacquer or glue on both sides thereof so as to support the metallization and make the helical support adhere to the outer hose.

In particular, before the reinforcement bands that are provided on the base hose are surrounded in an extrusion process (during which the base hose with the reinforcement bands is surrounded by a layer about 0.1 to 0.2 mm thick of a very soft transparent PVC which has a Shore hardness of about 50 to 60), the jacketed reinforcement bands, which are produced as described above, are rolled, glossy side up, onto the preheated base hose parallel to its axis so that they abut one another.

A variant involves rolling the reinforcement bands on in such a way that the surface of the base hose is completely covered, thus giving it a seamless appearance. To accomplish this, the edge of the reinforcement bands can be beveled, so that the places where they overlap are not thick. In order to ensure that the reinforcement bands adhere well to the helical support and to one another, the same glue is applied on the reinforcement bands as on the helical support.

A variant of the production process involves extruding, onto a base hose, a first outer hose, which has a thickness of about 0.2 mm, for example. Reinforcement bands made of an essentially unstretchable metallized film having tensile strength are laid on the outside of it in its axial direction, and they are laid at a distance to one another in the peripheral direction. They have the transparent second (outside) outer hose extruded over them, which can connect directly to the first outer hose in the space between the reinforcement bands. Here, the reinforcement bands also adhere directly to the first outer hose and to the second outer hose. The first inside outer hose can be pigmented in such a way that the structure of the base hose lying farther inside is no longer visible from outside.

A relatively simple way of producing the reinforced flexible hose is a variant which involves extruding, onto the base hose, an outer hose which has the reinforcement bands (which are made of an essentially unstretchable metallized film having tensile strength) already embedded in it in the longitudinal direction and at a distance of at least 1 mm to one another in the transverse direction around it. Here, the reinforcement bands also run into the extrusion tool when the outer hose is extruded.

Moreover, in the embodiment with a prism-shaped outer hose, it is simple for the metallized reinforcement bands to be able to run into the extrusion tool flatly, that is not curved over the width, after which they orient themselves in it parallel to the flat surface areas of the outer hose and are embedded in the outer hose.

What is claimed is:

1. A reinforced flexible hose comprising a thin-walled reinforced inner hose (1), at least one outside outer hose (4, 10, 14, 16), at least one helical support (2) between said inner hose and said outer hose, and reinforcement bands (6, 7, 11, 13, 17) which are oriented in an axial direction of said hose radially outside said helical support (2) and are connected to neighboring elements of said hose, wherein said reinforcement bands (6, 7, 11, 13, 17) are of an essentially unstretchable, high-gloss metallized film and are disposed in an area radially between a top side of said helical support (2) and below an outside surface of said outside outer hose (4, 10, 14, 16).

2. The reinforced flexible hose according to claim 1, wherein said reinforcement bands (6, 7, 11, 13, 17) are made of polyester.

3. The reinforced flexible hose according to claim 1 or 2, wherein said metallized film has a transparent layer of lacquer on both sides thereof.

4. The reinforced flexible hose according to claim 1 or 2, wherein said reinforcement bands (6, 7, 11, 13, 17) are glued on with a transparent glue on both sides.

5. The reinforced flexible hose according to claim 1 or 2, wherein said reinforcement bands (7) have PVC jackets.

6. The reinforced flexible hose according to claim 1, wherein said reinforcement bands (6, 7) are disposed between said helical support (2) and an inside surface of said outer hose (4) and glued thereto.

7. The reinforced flexible hose according to claim 1 or 2, wherein said reinforcement bands (11) are disposed between a first inside outer hose (9) and said second outside outer hose (10) which is radially outside of said first outer hose (9).

8. The reinforced flexible hose according to claim 1 or 2, wherein said reinforcement bands (13, 17) are embedded in said outer hose (14, 16).

9. The reinforced flexible hose according to claim 8, wherein a surface of said outer hose (16) has a shape of a prism with a plurality of flat outer surfaces with said reinforcement bands (17) aligned parallel to said flat outer surfaces in a plane.

10. The reinforced flexible hose according to claim 1 or 6, wherein gaps oriented in a longitudinal direction of said hose are formed between said reinforcement bands.

11. The reinforced flexible hose according to claim 1 or 2, wherein said reinforcement bands oriented in a longitudinal direction are set so as to abut one another.

12. The reinforced flexible hose according to claim 1 or 2, wherein each one of said reinforcement bands is 0.05 to 0.1 mm thick and approximately 3 to 6 mm wide.

13. The reinforced flexible hose according to claim 1 or 2, wherein each one of said reinforcement bands has a tensile strength of at least 10, preferably 14 Newtons, with a thickness of 0.075 mm and a width of 3 mm.

* * * * *